United States Patent [19]
Marts et al.

[11] Patent Number: 5,458,367
[45] Date of Patent: Oct. 17, 1995

[54] AIR BAG RESTRAINT DEVICE

[75] Inventors: Donna J. Marts; John G. Richardson, both of Idaho Falls, Id.

[73] Assignee: Lockheed Idaho Technologies Company, Idaho Falls, Id.

[21] Appl. No.: 226,135

[22] Filed: Apr. 11, 1994

[51] Int. Cl.⁶ .................................................. B60R 21/22
[52] U.S. Cl. ..................... 280/730.1; 280/728.3; 280/753; 280/743.1
[58] Field of Search ............................ 280/730 R, 728 R, 280/728 B, 743 R, 751, 753, 749; 180/271

[56] References Cited

U.S. PATENT DOCUMENTS

| | | | |
|---|---|---|---|
| 4,360,233 | 11/1982 | Kirchoff | 280/729 |
| 4,536,008 | 4/1985 | Brown, Jr. | 280/730 R |
| 5,172,933 | 12/1992 | Strasser | 280/740 |
| 5,172,934 | 12/1992 | Frantz et al. | 280/740 |

FOREIGN PATENT DOCUMENTS

| | | | |
|---|---|---|---|
| 1257096 | 4/1902 | Germany | 280/749 |
| 1203627 | 10/1965 | Germany | 180/271 |
| 3223123 | 12/1983 | Germany | |
| 4100754 | 4/1992 | Germany | 280/743 R |
| 4108477 | 9/1992 | Germany | 180/271 |
| 4141440 | 6/1993 | Germany | 280/749 |

*Primary Examiner*—Eric D. Culbreth
*Attorney, Agent, or Firm*—Hopkins Roden Crockett Hansen & Hoopes; Alan D. Kirsch

[57] ABSTRACT

A rear-seat air bag restraint device is disclosed that prevents an individual, or individuals, from continuing violent actions while being transported in a patrol vehicle's rear seat without requiring immediate physical contact by the law enforcement officer. The air bag is activated by a control switch in the front seat and inflates to independently restrict the amount of physical activity occurring in the rear seat of the vehicle while allowing the officer to safely stop the vehicle. The air bag can also provide the officer additional time to get backup personnel to aid him if the situation warrants it. The bag is inflated and maintains a constant pressure by an air pump.

7 Claims, 3 Drawing Sheets

AIR BAG RESTRAINT DEVICE

EG&G Idaho, Inc. has rights in this invention pursuant to Contract No. DE-AC07-76ID01570 between EG&G Idaho, Inc., and the United States Department of Energy.

FIELD OF THE INVENTION

This invention relates to a vehicle's rear-seat air-bag restraint device that can be inflated by driver actuation so that a violent passenger(s) is restrained against the seat without suffocating the passenger. The bag has permeable sections that slowly pass air through the fabric to allow the restrained passenger to breathe.

BACKGROUND OF THE INVENTION

Frequently, persons arrested and under transport in the rear seat of a patrol vehicle engage in violent actions, resulting in harm to themselves, extensive damage to the patrol car, and danger to officers and the public. The law enforcement community has suggested that vehicle safety air bags might be used to restrain individuals in these situations.

The objective of this system is to use an air bag to prevent an individual or individuals from continuing violent actions while being transported or detained in a patrol vehicle without requiring immediate physical contact by the law enforcement officer. The air bag independently restricts the amount of physical activity occurring in the rear seat of the vehicle while allowing the officer to safely stop the vehicle. The air bag can also provide the officer additional time to get backup personnel to aid him if the situation warrants it.

Front-seat vehicle safety air bags initiated the air bag restraint concept, but the actual hardware is of little use in meeting the design requirements that have been developed for the rear-seat patrol-vehicle air bag restraint system. Vehicle safety air bags certainly hold enough pressure, but they are designed for an entirely different purpose. Typically, safety air bags are a fabric material packaged inside the steering wheel or instrument patent. Deceleration sensors in the vehicle detect a frontal crash above a predetermined level of accident severity; then, a control module signals the inflation module to deploy the air bag. The inflator module includes a sealed canister containing sodium azide pellets. When the control module signals the inflator to deploy the air bag, the sodium azide undergoes a chemical reaction that rapidly generates nitrogen gas to inflate the bag. As the bag inflates, some residue will exist. This residue consists primarily of corn starch and/or talcum powder used by the manufacturer as a lubricant and byproducts of the chemical reaction. A small amount of sodium hydroxide dust, which is a potent irritant, is produced as a byproduct of the reaction, but the sodium hydroxide quickly converts to sodium carbonate and sodium bicarbonate. The bag inflates in approximately 0.05 seconds to full size, then deflates immediately through vent holes, helping to restrain the individual more gradually.

Under optimum conditions, individuals are handcuffed, placed in the vehicle, put in their seat belt, and then transported to their designated deterrent location, usually a police station. This scenario adequately defines the geometric configurations an individual can be in; however, these optimum conditions do not always occur. Since no single geometric configuration defines how a person sits in the vehicle, the air bag must be designed to handle all possible configurations. There is no standard profile of what type of person (e.g., large person, male, young, etc.) is most often involved in violent outbursts so no body type determinations could be made. The type of violence that occurs is also quite varied. Usually, individuals use their legs to break windows, push on the front seat or the barrier, or damage doors. Instances have occurred where officers have been injured by individuals using items such as belt buckles to cut them, as well as cases where individuals have broken out the rear window, crawled out, and then been killed by an oncoming vehicle. The conclusion drawn from discussions with law enforcement personnel is that there is no typical violent individual, no typical condition under which violence occurs, and no typical type of violent action.

The use of the air bag allows an officer the optimum ability to protect the public, to protect a suspect from personal injury, and to allow enough time to remove the patrol vehicle from traffic and regain control. Also, the use of the air bag protects the officer from sustaining injury at the hands of a suspect who desires to break free or cause bodily harm.

SUMMARY OF THE INVENTION

Some of the design requirements established for this air bag are listed below:

1. The air bag is activated manually. The officer needs to initiate any action regarding the air bag. He is the person who is liable; thus, he needs to be able to determine when an air bag should be deployed. A manually-activated system is also typically less expensive and less likely to have a malfunction than an automated system. In addition to the manual system, sensors also could be placed in, and around, the rear seats to automatically activate the air bag based on motion or force criteria.

2. The system must restrain individual(s) for at least 2 minutes and be able to inflate between 1 and 10 seconds. A very rapid inflation time (less than 1 second) poses design and safety concerns.

3. The system must be inexpensive. Ideally, the air bag restraint device should be installed on new vehicles or back-fitted on all patrol vehicles, and the cost of the system should be no more than current commercially-available restraint seats.

4. The air bag system should accommodate various seating arrangements, i.e., individuals with or without seat belts and handcuffs, one person or two, larger person or small, etc. Since no unique seating configuration exists upon which to base the design, the air bag must serve all possible body configurations. Individuals sitting, lying on the seat, lying on the floor, kneeling, or standing on the seat, all have been considered in the design.

5. The air bag must restrain individual(s) without posing a suffocation threat or a physical hazard. Since the minimum restraining time is 2 minutes, suffocation is a possibility. Therefore, the air bag must prevent this from occurring. Restraining does not mean that the individual must be pinned with all the air knocked out of him.

6. The air bag must be washable or replaceable and not rip or tear easily. An assumption was made that blood and saliva will end up on the air bag itself. To mitigate any health concerns associated with this, the air bag must either be washable or so inexpensive that replacing it is trivial. The air bag must also be rugged and not tear or rip easily.

The preferred concept is a semipermeable bag. Part of the bag is made from permeable material and part is made from impermeable material. The bag engulfs the entire back seat. The impermeable material provides the restraining force while the permeable material prevents suffocation.

Generally stated, the invention consists of:
an inflatable air bag restraint device for restraining a violent person in a rear seat of a vehicle, said device comprising:
   a plenum and frame attached to a vehicle roof;
   an air bag removably affixed to the plenum, said air bag having multiple permeable sections and a non-permeable fabric section;
   an air pump connected to the plenum;
   control means to activate the air pump;
   a movable container supporting the air bag in a stored position;
wherein activation of the control means inflates the bag, maintains a constant pressure, and restrains the person without causing suffocation of the person.

Other objects, advantages, and capabilities of the present invention will become more apparent as the description proceeds.

DETAILED DESCRIPTION OF THE INVENTION

Figure 1:
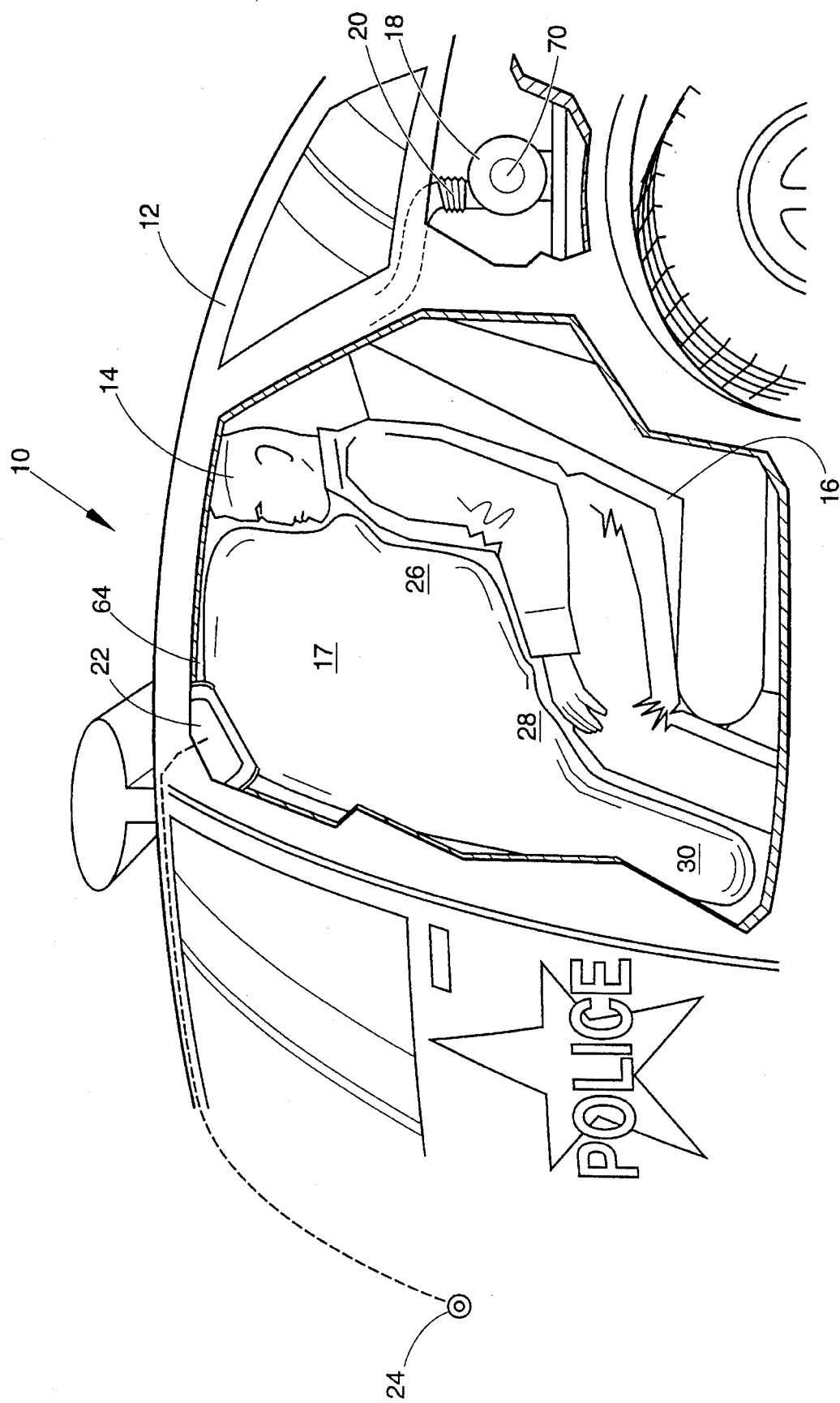
FIG. 1 is a side cut-away section view of the deployed restraint bag of the present invention.

FIG. 1 discloses an air bag restraint device 10 in a deployed condition within police car 12, restraining a person 14 against back seat 16. The bag 17 has been filled by an electric air pump 18 pumping air through tubing 20 to a ceiling mounted hinged container 22 shown in an opened position. The bag has been deployed (filled with air) by actuating a control switch 24 in the front dashboard area, by the officer. The person 14 is restrained by a body portion 26, a thigh portion 28, and a lower leg portion 30 of the bag 17.

FIGS. 2A, 2B, 2C, and 2D illustrate the air bag 17 detailed by the back view, side view, and top and bottom views, respectively. The air bag's permeable sections, typically canvas, are shown at 32, 34, and 36 for the body, thigh, and leg portions, respectively. The remaining bag is formed from non-permeable nylon as at 38, 40, 42, 44, and 46 for the body, thigh, leg, sides, and top portions, respectively.

The permeable body portion 32 discharges air to reach the person's face, and the permeable thigh portion 34 discharges air to a person that is lying on the seat 16. The permeable leg portion discharges air to a person lying on the floor of the car 12.

Figure 3:
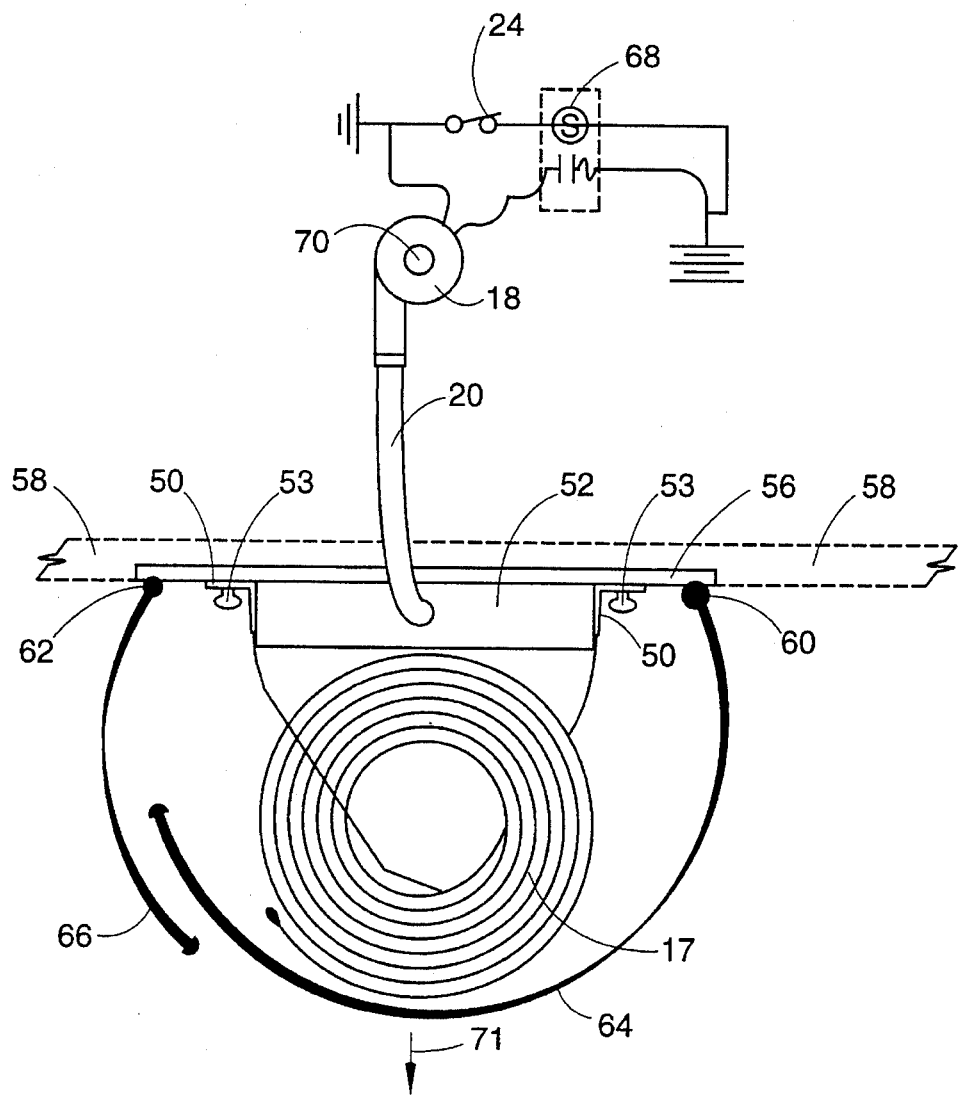
FIG. 3 is a schematic diagram of the coiled bag, air system, and control system.
Figures 4A, 4B:
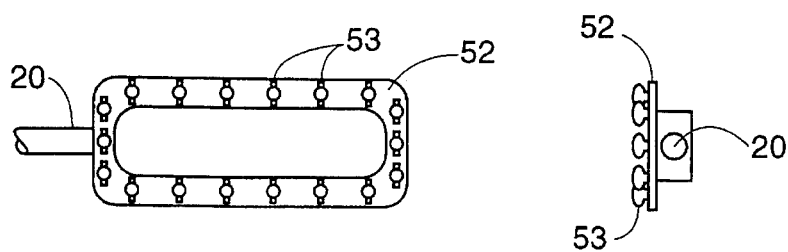
FIG. 4A is a top view of the plenum.
FIG. 4B is an end elevation of the plenum.

Referring to FIG. 3, a preferred embodiment of the invention is shown. Air from air pump 18 passes through tube 20 and enters plenum 52. Plenum 52, having multiple twist lock fasteners 53 (as shown in FIGS. 4A and 4B), is attached to base plate 56, which in turn is secured to the car roof 58. Air bag is joined to a flange 50, said flange having elongated apertures 54 (FIG. 2C) through which twist lock fasteners 53 are inserted and twisted to securely attach the air bag and flange to the plenum.

In the stored position, the bag 17 is rolled up in a helicoil configuration and contained by spring loaded hinges 60 and 62 which close a semicircular half-cylinder 64 and a quarter- (or smaller) circular cylinder 66.

The air bag restraint device 10 is activated by closing switch 24 that energizes solenoid 68 to start electrical air pump 18. Air pressure in the plenum 52 and bag 17 causes the bag to uncoil and fill, extending downward as at arrow 71 forcing open cylinders 64 and 66, until fully inflated as in FIG. 1.

The air bag will remain inflated to restrain the person until switch 24 is de-activated. After the bag has been deflated or evacuated by reversing the air connection at air pump 18 to connect to the suction connection 70 (FIG. 1), the bag can be removed for cleaning by rotating the twist-lock fasteners 90° and removing the bag flange 50 and bag 17.

Figure 2C:
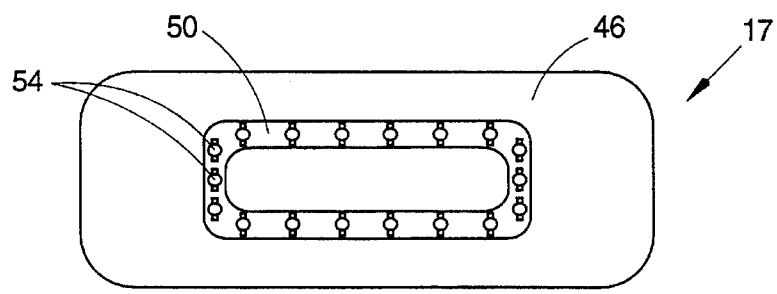
FIG. 2C is a top view of the restraint bag.
Figure 2A:
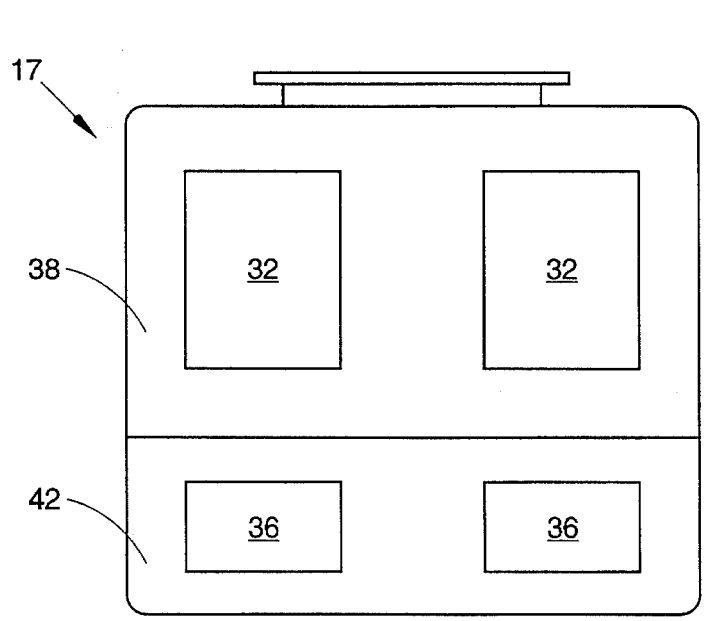
FIG. 2A is a back elevation of the restraint bag.
Figure 2B:
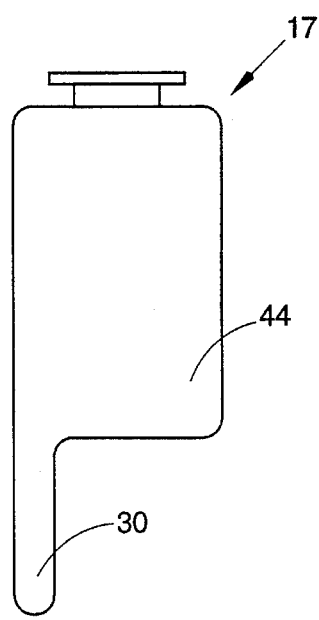
FIG. 2B is a side elevation of the restraint bag.
Figure 2D:
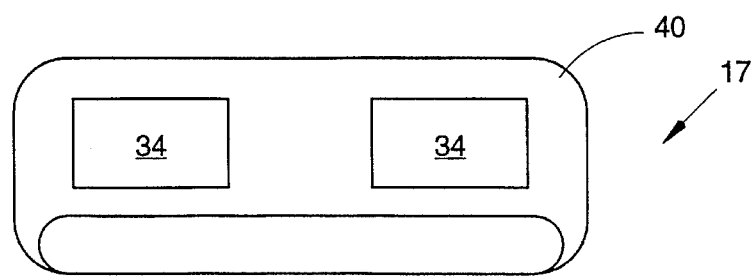
FIG. 2D is a bottom view of the restraint bag.

The preferred materials for the bag in FIGS. 2A, 2B, and 2D would be nylon for impermeable sections and canvas for the permeable sections 32, 34, and 36. The air pressures needed are on the order of 5 to 10 inches of water which exerts a pressure of about 70 pounds on the torso and thigh areas. The motor for the air pump needs to be something over 1 horsepower, and this rating will fill the bag in about 2 seconds.

Although the present description discloses air bags for police cars, the bags could be used in any vehicle or, for that matter, in a jail cell to restrain violent prisoners using the same device and operating in a similar fashion.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. An inflatable air-bag restraint device for restraining a violent person in a rear seat of a vehicle, said device comprising:
   a. a plenum and frame attached to a vehicle roof;
   b. an air bag removably affixed to the plenum, said air bag having multiple permeable sections and a non-permeable fabric section;
   c. an air pump connected to the plenum;
   d. control means for activating the air pump;
   e. a movable container supporting the air bag in a stored position;
   wherein activation of the control means inflates the bag, maintains a constant pressure, and restrains the person without causing suffocation of the person.

2. The restraint device as recited in claim 1 wherein the plenum has a multiplicity of twist-lock fasteners that engage a multiplicity of elongate apertures in the air bag.

3. The restraint device as recited in claim 2 wherein the air bag's permeable sections are adjacent a person's torso, thighs, and lower legs in the inflated condition.

4. The restraint device as recited in claim 3 wherein the container comprises a half-cylinder and a quarter-cylinder each having spring-loaded hinges.

5. The restraint device as recited in claim 4 wherein the bag is coiled in a form of a helix in the stored condition and inflation of the bag fills a vehicle's rear seat and floor area.

6. An inflatable air bag restraint device for restraining a violent person in a rear seat of a vehicle, said device comprising:

a. a plenum and frame attached to a vehicle roof;

b. an air bag removable affixed to the plenum by a plurality of twist-lock fasteners, said air bag having multiple permeable sections and a non-permeable fabric section;

c. an air pump connected to the plenum;

d. control means for activating the air pump;

e. a movable half-cylinder and quarter-cylinder container supporting the air bag in a stored position, said cylinders each having a spring-loaded hinge;

wherein activation of the control means inflates the bag and restrains the person by filling a vehicle's rear seat and floor area without causing suffocation of the person.

7. The restraint device as recited in claim 6 wherein the air bag's permeable sections are adjacent a person's torso, thighs, and lower legs in the inflated condition.

* * * * *